though patented october 31, 1967

3,350,714
RADIO GUIDANCE SYSTEM FOR AIRCRAFT
Philip Hulme Walker and David Cawsey, London, and
Ronald Thomas Albert Howell, Chessington, England,
assignors to Decca Limited, London, England, a British
company
Filed Sept. 3, 1965, Ser. No. 484,886
11 Claims. (Cl. 343—106)

ABSTRACT OF THE DISCLOSURE

A radio system for guidance of an aircraft along a required track includes a radio transmitter located near one end of the track with a directional aerial radiating two overlapping narrow beams angularly spaced in the plane in which guidance is required. The beams are oscillated about the track line and distinctive signals are radiated on the two beams. On the aircraft, the distinctive signals are separated and used to determine the time differences between each successive instant when the beams scan across the aircraft and hence the deviation from the required track.

---

This invention relates to radio systems for guiding an aircraft along a predetermined track and may be used to provide guidance in azimuth and elevation. The invention is particularly applicable to precision approach and landing systems.

Prior art systems of the kind to which this invention relates are exemplified by British Patent No. 458,347 in the name of Telefunken, which discloses a radio transmitter located at or near one end of the required track and arranged to radiate a single beam oscillated from side to side in a plane through the required track so that at a receiver on the aircraft directional information may be obtained by indicating the relative times between the receiving of signals from the beam. In this and similar systems, if the times between successive instance of reception are the same, the aircraft is on the required track. However, if the aircraft is near one side of the limit of the sector scan there will be a relatively short time between two successive receptions and a relatively longer time between the next two successive receptions and so on. However, systems of the kind exemplified in the patent mentioned show certain disadvantages. The most important of these is the poor accuracy obtainable using a single beam in the manner disclosed, since signals are inevitably received from different points on the main lobe or from side lobes of the radiated beam, producing ambiguous readings of azimuth or elevation as the case may be. A further disadvantage is that using a single beam the angular width of the radiated beam will to a large extent determine the accuracy of indication that can be obtained. Furthermore, use of the disclosed system in British Patent No. 458,347 does not make possible the determination of the sense of the deviation from the required track line.

It is an object of this invention to provide an improved radio system for guidance of an aircraft with which the deviation of the aircraft from a required track may be determined with great accuracy.

A further object of this invention is to provide a system in which the sense of the deviation from the required track line may be easily obtained.

A further object of this invention is to provide a combined beacon and radar system in which not only may deviation information be obtained at the aircraft, but also azimuth and elevation information with regard to range may be obtained at the location of the transmitter.

This invention provides a radio system for guidance of an aircraft along a required track comprising a radio transmitter located at or beyond one end of the track and having a directional aerial system to radiate two overlapping narrow directional beams angularly spaced in the plane in which track guidance is required, the aerial system being operative to oscillate the radiated beams about the track line in said plane, the signals on the two beams being made distinct so as to be separable at a receiver and on the aircraft, means for receiving and separating the signals radiated on the two beams, means for determining the time instants when the signals of the two beams are of equal amplitudes, and means responsive to the differences in the time periods between such successive time instants as the beams scan across the aircraft to determine thereby the deviation of the aircraft from the required track line.

The time instants of equal amplitude of signals on the two beams occur twice in each scanning cycle of the beam sweep across the aircraft. If the aircraft is to one side of the required track line near the limit of the angular scan, then as the equisignal line of the two beams moves towards that limit, it will sweep across the aircraft and very soon afterwards it will sweep back again and there will be a relatively long time interval before the equisignal line is again picked up by the aircraft. If on the other hand the aircraft is on the required track line, there will be equal time intervals between the successive time instants of equal amplitudes of signals. The ratio of the time periods between the successive time instants of equal amplitude of received signals gives a measure of the angular deviation of the aircraft from the required track line. This invention further provides a square wave generator generating a square wave whose cross over points are determined by the time instants when the scanning beam scans through the aircraft, so as to produce a square wave signal of constant frequency but with a mark to space ratio varying in accordance with the deviation of the aircraft from the required track. A further object of the invention is to provide inverting and averaging circuits for extracting the magnitude and sense of the deviation from the track line.

The above objects and further objects and features of the present invention will be readily apparent from the following description, reference being made to the accompanying drawings in which.

In order to simplify the understanding of this invention, the part of the system for radio guidance of the aircraft will be described first. The present system, as will be further explained with reference to FIGURES 6, 7 and 8 may provide guidance in both azimuth and elevation for an aircraft. It will be readily understood that the system described in FIGURES 1 to 5 relate solely to the necessary components for providing guidance of the aircraft in one of the angular directions.

Figure 1:
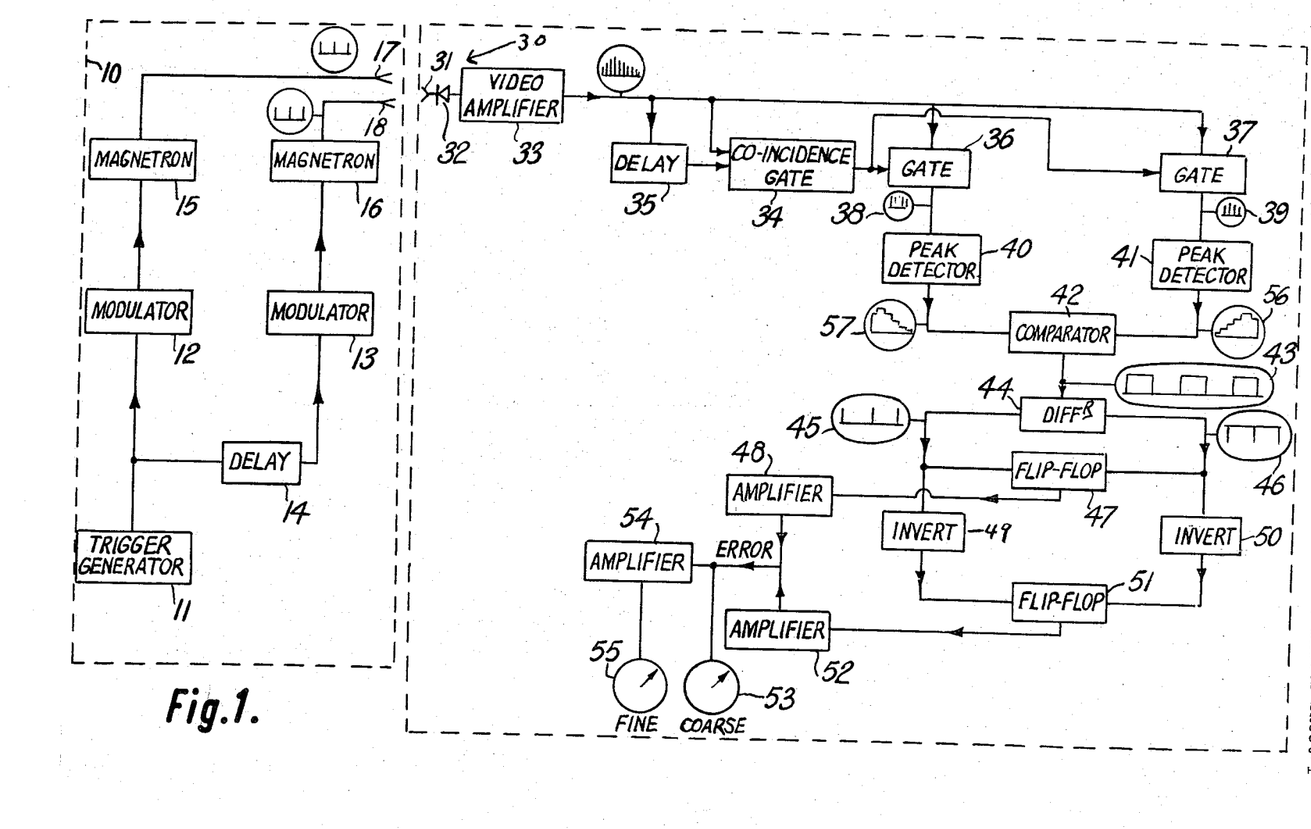
FIGURE 1 is a block diagram illustrating part of the radio system for the guidance of an aircraft.
Figure 2:
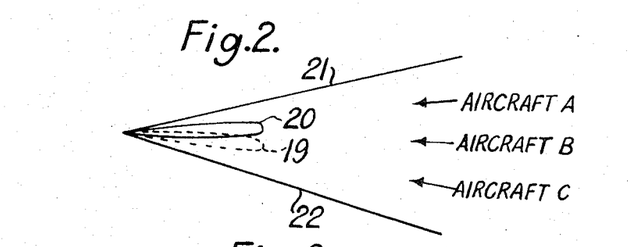
FIGURE 2 is a diagram illustrating the aerial scanning over a sector.
Figure 3:
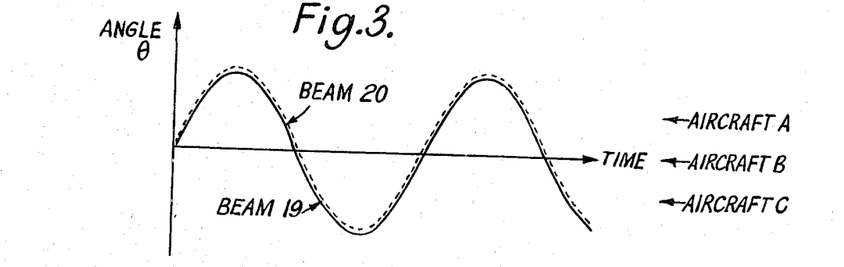
FIGURE 3 is a graphical diagram illustrating a scanning characteristic.

Referring to FIGURE 1, a transmitting station 10 comprises a trigger generator 11 feeding trigger pulses to first and second modulators 12, 13 respectively, the pulses to the modulator 13 being delayed by a delay unit 14 so that the outputs of the two modulators are interspaced. The amount of delay is not critical so long as the pulses are separated in time but are not equally spaced. The pulses from the modulators 12, 13 modulate magnetrons 15, 16 respectively which feed short duration pulses of microwave energy to aerials 17, 18. These two aerials provide narrow directional beams 19, 20 (FIGURE 2) which overlap and which are scanned synchronously over a limited angular sector defined by the lines 21, 22 in FIGURE 2. FIGURE 3 is a graphical diagram illustrating the relationship between the scanning angle $\theta$ of the beams, measured from a datum line bisecting the area scanned, and time; it will be seen from FIGURE 3 that the two beams swing together through a limited sector with a small angular difference between the directions of the two beams. Conveniently, this angular difference is substantially constant but this is not necessary for the operation of the system.

Figure 5:
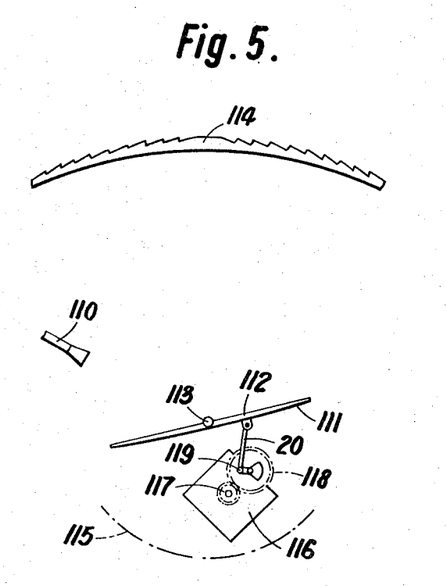
FIGURE 5 illustrates diagrammatically an aerial system.

The aerial system to provide the necessary sector scanned beam is illustrated in FIGURE 5. Radiation from the horn 110 is directed on to a reflector plate 111 having a flat reflecting surface 112. The plate is pivotally mounted for oscillation about an axis 113 lying in the plane of the surface 112. Radiation from the horn 110, after reflection from the surface 112 is directed through a lens 114 which is illustrated diagrammatically as being constructed in a manner similar to an optical lens. It will be understood however that this lens may be constructed in any of the known manners for constructing radio frequency lenses. In the arrangement shown, the lens 114 is arranged to have a spherical focal surface indicated by the dash line 115. This spherical surface is centred on a point on the axis 113 lying in the planes of lens and horn. In general the lens would be arranged to have only a small depth in the direction normal to the plane of the paper in the drawing and it may be assumed therefore that the focal surface consists of a narrow band which would be approximate to a cylindrical arc centred about a point on the axis 113 lying in the plane containing the centre of the horn and the central line of the lens. The reflector plate 111 is rocked to and fro about the axis 113 by a mechanism comprising a motor 116 driving a continuously rotatable pinion 117 engaging a spur wheel 118 having an eccentric pin 119 which rocks the plate 111 by means of a crank 120.

It will be seen that as the plate 111 is rocked the image of the horn 110 as seen from the lens traverses the arc 115. The arrangement thus provides a particularly simple method of scanning a radio beam since neither the lens 114 nor the source 110 has to be moved. The reflector plate is oscillated to and fro through a limited angle by means of the continuously rotating motor 116. It is found readily possible to produce with such an arrangement a beam of one degree width which can be swung through an arc of plus or minus twelve degrees with negligible loss in gain or increase in side lobe level. It will be understood that horn 110 is a double horn constituting both horns 17, 18 in FIGURE 1, so that the sector scanned is the same for both beams. The pulse repetition rate is made high compared with the aerial scanning frequency so that many pulses are radiated during each scanning cycle.

In a typical construction for precision approach and landing guidance in azimuth employing overlapping beams, each radiated beam might have a beam width of the order of half a degree and be scanned over a sector of about fifteen degrees; with such a construction a centre line accuracy of plus or minus three minutes of arc might well be achieved thereby giving a deviation of plus or minus ten feet at a range of 10,000 feet. It will be noted that accuracy of this order enables the device to be used as a precision approach and landing aid for an aircraft having sufficient accuracy for incorporation in an automatic landing system. For azimuth guidance, the transmitter may be located at the overshoot end of the runway on which the aircraft is to land and may provide the required accuracy of indication of lateral deviation from the required track during the approach to the end of the runway and also guidance along the length of the runway. If elevation guidance is required in a landing system, a transmitter may be located adjacent to the touchdown point and arranged to provide guidance in elevation along the required glide path for an approach. In an automatic landing system, this elevation guidance would in general be used only for the approach to the beginning of flare out and the final landing would preferably be controlled using an altimeter, for example a radio altimeter.

The equipment on the aircraft is shown at 30 in FIGURE 1 and includes a receiving aerial 31 with a crystal detector 32 and video amplifier 33. A very small aerial may be employed on the aircraft since an aerial with a relatively large beamwidth would generally be required. The output from the video amplifier is fed to a coincidence detector 34 both directly and via a delay unit 35 giving a delay equal to that introduced by the delay unit 14 in the transmitter. At the coincidence detector, the pulses from magnetron 16 and aerial 18, after being fed directly to the coincidence detector, will coincide with pulses from the magnetron 15 and aerial 17 delayed by the delay unit 35. The coincidence detector 34 produces, on each such coincidence, an output pulse which is fed to a first gate 36 to open that gate and is also fed to a second gate 37 to close that gate. The signals from the video amplifier 33 are fed to the gates 36, 37 and thus the gate 36 will pass the signals from magnetron 16 and aerial 18 whilst the gate 37 will pass the signals from magnetron 15 and aerial 17. The outputs from the gates 36, 37 will comprise a series of video pulses, as indicated at 38 and 39 in FIGURE 1. These pulses are fed to peak detectors 40, 41 respectively and produce rectified outputs as indicated at 56 and 57 respectively. Because of the different angular positions of the two aerial beams, these rectified outputs will, in general, differ in amplitude. Twice in each cycle of aerial scan, however, the rectified outputs will be equal. The amplitudes of the outputs from the peak detectors 40, 41 are compared by a comparator 42 which gives a square wave output, indicated at 43, the change in the output occurring when the rectified outputs are equal. One complete cycle of this square wave output corresponds to one cycle of aerial scan but the mark-to-space ratio of this square wave will depend on the angular position of the aircraft within the scanned sector. The square wave output from the comparator 42 is fed to a differentiating circuit 44 producing two outputs, one of positive-going pulses and the other of negative-going pulses, corresponding to the leading and trailing edges of the square wave from the comparator 42. These pulses are indicated at 45 and 46.

Figure 4:
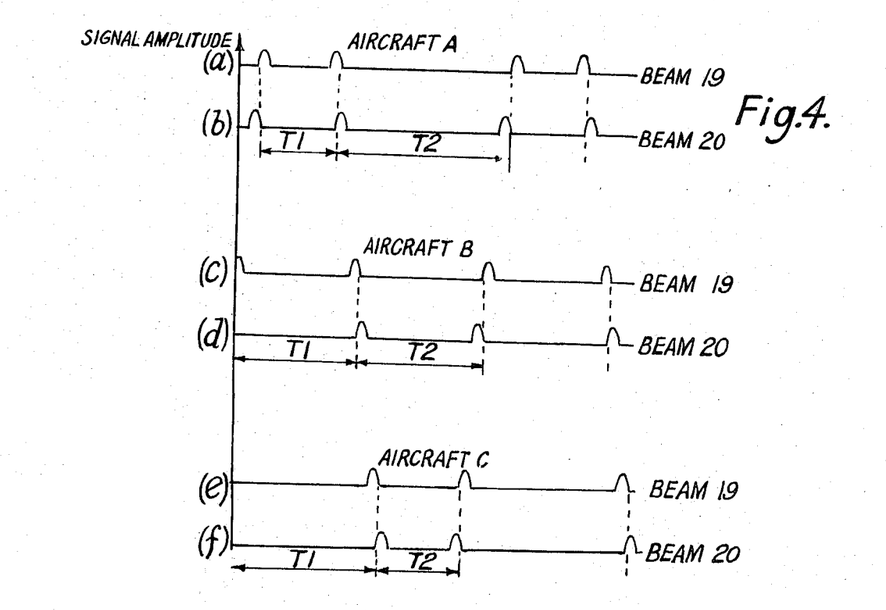
FIGURE 4 is a diagram illustrating the signals received by air craft in different positions.

FIGURE 4 illustrates the signals received at an aircraft. Lines $a$ and $b$ in FIGURE 4 show the relationship between amplitude and time of signals from the beams 19 and 20 respectively for an aircraft at position A in FIGURE 2 and the vertical dotted lines show coincidence times, that is to say the times of the output pulses from the differentiating circuit 44. It will be seen that, for position A, the time interval $T_1$ between the instant when the beams swing across the aircraft in a anticlockwise scan and the instant when the beams swing across the aircraft in a clockwise scan is less than the time $T_2$ which is the time interval between the instant when the beams swing across the aircraft in a clockwise scan and the instant when the beams swing across the aircraft in an anticlockwise scan. Lines $c$ and $d$ show the pulses received from an aircraft in position B in FIGURE 2 and in this case $T_2$ is equal to $T_1$. Lines $e$ and $f$ show the pulses received from an aircraft in position C in FIGURE 2 and here $T_2$ is less than $T_1$.

The pulses from the differentiating circuit 44 are fed to a flip-flop 47, the output of which resembles waveform 43 and is fed to amplifier 48 which extracts the average value of the output. The two outputs from the differentiating circuit 44 are also inverted by inverters 49, 50 and fed to a second flip-flop 51 to produce an output wherein the spaces and pulses of waveform 43 are interchanged. Amplifier 52 extracts the average value of this output. If the output from the comparator 42 was a square wave with a mark-to-space ratio of unity, then the outputs of the two amplifiers 48, 52 would be equal. If the mark-to-space ratio is not unity, the outputs of the two amplifiers 48, 52 will be unequal. The difference between these outputs is fed, firstly, to a coarse error indicator 53 and, secondly, to an amplifier 54 feeding a fine error indicator 55. The signals fed to the indicators are direct current signals and the indicators thus give an indication not only of the magnitude but also of the sense of the error.

It will be seen that the indicators 53, 55 will give an indication of the angular position of the aircraft with respect to the transmitting aerial. For aircraft guidance, it is required that the aircraft should move along the required guidance line (in azimuth or elevation) and generally it is only necessary to indicate the sense and approximate extent of deviation from the guidance line. The indicators however can be calibrated if necessary to indicate the magnitude of deviation from the guidance line.

For azimuth guidance it will generally be preferable to use symmetrically shaped beams scanned symmetrically about a datum direction. For elevation guidance, it may in some cases be preferable to use an asymmetrical scan.

Figure 6:
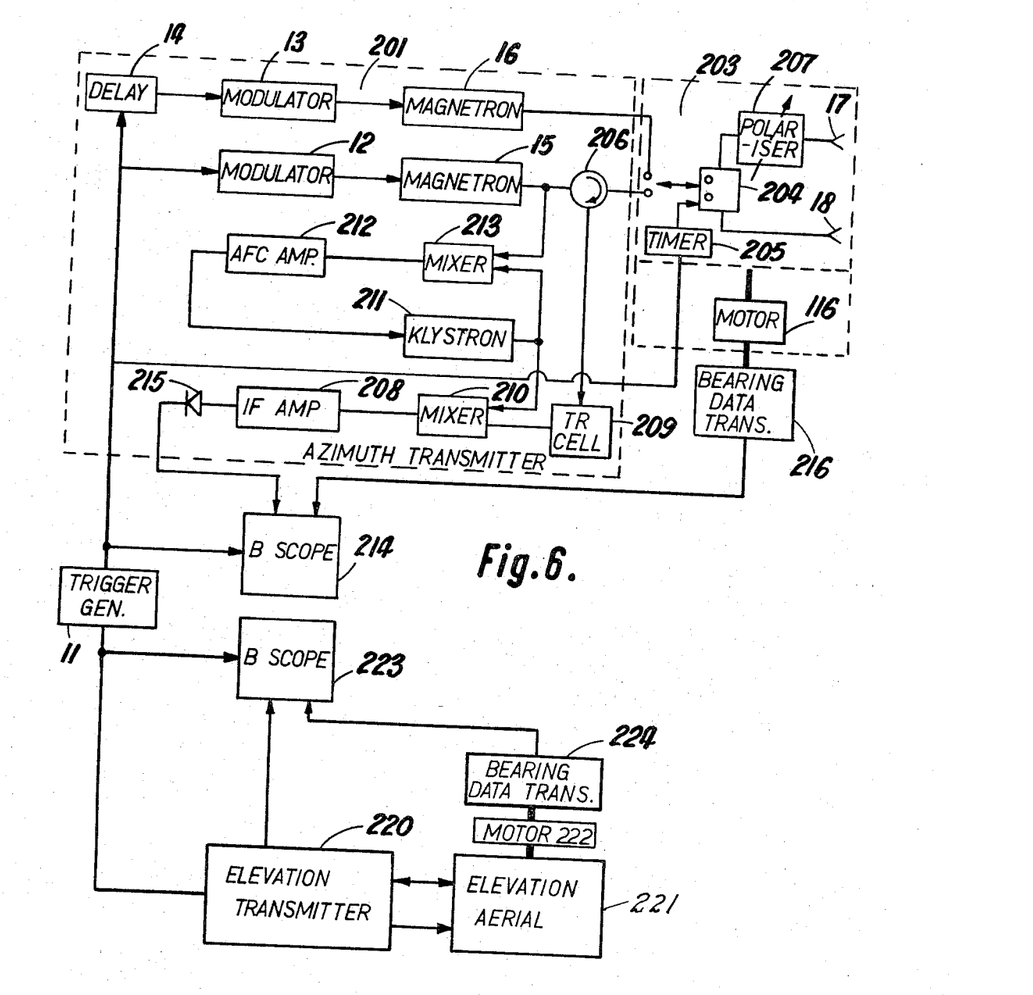
FIGURE 6 is a block diagram illustrating a combined radar and radio transmitting system.
Figure 7:
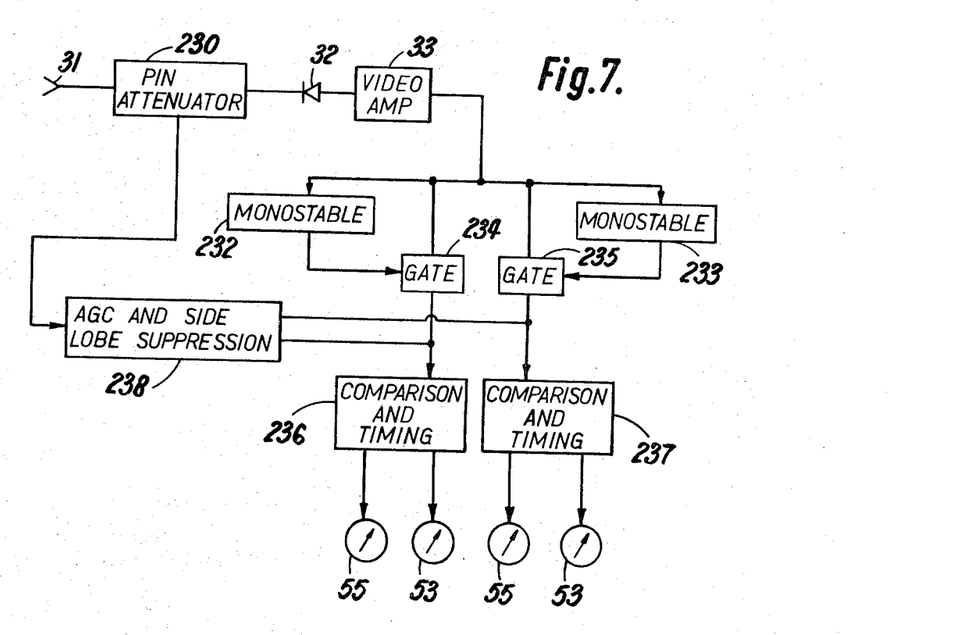
FIGURE 7 is a block diagram illustrating a receiving system for an aircraft for use with the system of FIGURE 7.
Figure 8:
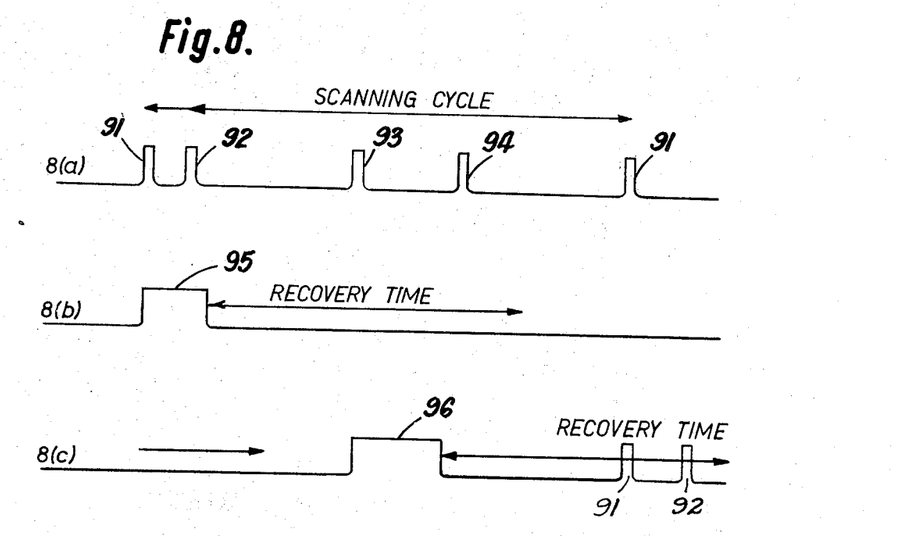
FIGURE 8 illustrates the relative times of pulses in the system of FIGURES 6 and 7.

FIGURES 6, 7 and 8 illustrate a modification of the system shown in FIGURES 1 to 4 which provides signals for guidance in both azimuth and elevation and also radar data at the location of the transmitter.

In FIGURE 6, which illustrates the modified transmitting station the trigger generator 11 feeds trigger pulses to modulator 12 in an azimuth transmitter 201 and to modulator 13 via the delay unit 14. The pulses from modulators 12, 13 modulate magnetrons 15, 16 respectively which feed short duration pulses of microwave energy to aerials 17, 18. These two aerials provide narrow directional beams scanned in the azimuth plane by the aerial system 203 which comprises an aerial system as shown in FIGURE 5. The ferrite switch 204 is operated in synchronism with the pulse repetition frequency by the timer 205 to permit pulses from the magnetron 12 to pass to aerial 17, subsequently to permit pulses from magnetron 13 to pass to aerial 18 and then, during the period falling transmission from magnetron 18 to permit only signals from aerial 17 to pass to circulator 206 in transmitter 201. Only the "master" pulses, i.e. the first pulses in each pair triggered by trigger generator 11 are used for obtaining the radar information. Discrimination between echoes from pulses radiated from aerials 17 and 18 may be provided by radiating signals of different frequency, so that signals derived from magnetron 16 will be rejected by the IF amplifier 208 which is fed with incoming echo signals from the TR cell 209 through mixer 210. It is however, not essential to do this, and discrimination is preferably provided by utilising the timing sequence explained with the aid of FIGURE 8. It is therefore possible to use only one magnetron with appropriate timing thereof to replace magnetrons 16, 17. The other magnetron might therefore be used as or in a "standby" transmitter. The polariser 207 is used to reject rain clutter in the usual way. The other input to the mixer 210, is from klystron 211 (acting as the local oscillator) fed through AFC amplifier 212 from mixer 213 which is fed from magnetron 15, the output of the klystron 211 being also fed back to mixer 213 to provide automatic frequency control.

The trigger pulses from trigger generator 11 are also fed to start the time base for a conventional B-scope 214 displaying azimuth versus range 214 whose range input is obtained from detector 215 at the output of amplifier 208 and whose azimuth input is obtained from bearing data transmitter 216 coupled to the shaft rotated by tuning motor 116 for aerial system 203.

The equipment for elevation control is duplicated in elevation transmitter 220 feeding aerial system 221 scanning in the vertical plane by turning motor 222, the bearing data for B-scope 223 being obtained from bearing data transmitter 224, coupled to turning motor 222, and the trigger generator 11 also provided trigger pulses to start the time base in B-scope 223 which displays elevation versus range.

FIGURE 8(a) shows the timing of radiated pulses from the azimuth and elevation transmitters. The delay between the pulse pairs 91, 92 and 93, 94, radiated from the azimuth transmitter, is made different for the two channels so that the receiver at the aircraft can distinguish between them. Furthermore, the two frequencies for the elevation channel are different from the frequencies for the azimuth channel to prevent signals from one channel appearing at the output of the other. Further discrimination may be achieved by staggering the cycles of scan of the two aerial systems.

The receiver at the aircraft for use with the transmitter of FIGURE 6 is shown in FIGURE 7. Signals are received by aerial 31 with a pin attenuator 230, crystal detector 32 and video amplifier 33. All the received pulses are fed to monostables 232 and 233, which provide outputs slightly longer than the shorter delay and slightly shorter than the longer delay. The output from monostable 232 provides a gate opening signal 95 in FIGURE 8(b) to gate 234 and monostable 233 provides a gate closing signal (96 in FIGURE 8(c)) to gate 235, the received signals being fed also to gates 234 and 235. The monostables 232 and 233 have a recovery time such that they can be triggered only once in a cycle of the pulse repetition frequency. The signals for azimuth and elevation channels appear separately at the outputs of gates 234 and 235. The comparison and timing 236 and 237 comprise, for each channel the circuitry of FIGURE 1 from the output of video amplifier 33 to the indicators 53 and 55.

The outputs from gates 234 and 235 are also fed back via conventional AGC and sidelobe suppression circuits 238 to the pin attenuator 239 to ensure that the two channels have equal gains at all times. It would be necessary to provide automatic amplitude control at the transmitters to ensure equality of power output levels.

Instead of using pulse modulation, continuous wave signals may be radiated modulated sinusoidally at different frequencies. Typically modulation frequencies of the order of 50–100 kc./s. might be employed and ferrite modulators might be used in the ground transmitters for this purpose. In the aircraft receiver, the two signals may be detected with a common detector and amplified and the detected signals may then be separated, for example by tuned amplifiers if modulations of different frequencies are employed, and compared in amplitude by a comparator and differentiating circuit giving an output pulse at each time instant when the two compared signals pass through equality in amplitude. The comparator and differentiating circuit for this purpose may be similar to that of FIGURE 1.

A monitoring and correction system may be employed in order to ensure that the amplitudes of the two beams are correctly matched. In order to provide a further check on the correct operation of the system of the aircraft, provision may be made for periodically reversing the feeds to the two magnetrons, for example for one scan in every ten, and noting on the aircraft whether this particular scan produces any change in the magnitude of the determined deviation apart from the reversal of the apparent sense of deviation.

For checking operation in an approach or landing aid for an aircraft, an alignment checking ground monitor might be provided which may be generally similar to the airborne receiver and which is sited on the required track line as near the touch-down point as safety would allow. This might be associated with an approach monitor receiver having an aerial system which is pointed up along the glide path and which receives echoes from an aircraft approaching sytem. This would have a narrow fixed beam and might serve both to warn the ground control of the aircraft on approach and to verify that the aircraft is on the centre line.

Although the airborne apparatus has been described as having indicators for indicating deviation from the required guidance line, the information from this radio guidance system might be utilised directly by an autopilot and more generally the display and/or utilisation of the output information would be arranged to suit the requirements for which it is to be employed.

We claim:

1. A radio system for guidance of an aircraft along a required track, comprising:

a radio transmitter located near one end of the track; a directional aerial system coupled to said radio transmitter and operative to radiate two overlapping narrow directional beams angularly spaced in the plane in which track guidance is required; means for oscillating the radiated beams about the track line in the plane in which guidance is required; the transmitter providing signals on the two beams which are pulse modulated at the same pulse repetition frequency but with the pulses of one being delayed with respect to the pulses of the other beam; and on the aircraft, means for receiving and separating signals radiated on the two beams; means for determining the time instants when the signals of the beams are of equal amplitude; and means responsive to the differences in time periods between such successive time instants as the beams scan across the aircraft to determine thereby the deviation of the aircraft from the required track line.

2. A radio system for guidance of an aircraft along a required track, comprising:

a radio transmitter located near one end of the track providing first and second series of pulses of radio frequency energy, the pulses of the second series being delayed with respect to said first series; a directional aerial system coupled to said radio transmitter to radiate said first and second series of pulses as two narrow overlapping beams and to oscillate said beams repetitively over a limited sector in the azimuth plane about said required track; a radio receiver in said aircraft; said radio receiver including:

means for receiving signals derived from said pulses when said beams scan across the aircraft; separating means for separating received signals derived from pulses in each series; means for determining the time instants when received signals from pulses in the first and second series are of equal amplitude; and means responsive to the difference in time periods between such successive time instants to provide an output representing the deviation in the respective plane of the aircraft from said required track line.

3. A radio system for guidance of an aircraft along a required track, comprising:

a radio transmitter located near one end of the track providing first and second series of pulses of radio frequency energy, the pulses of the second series being delayed with respect to said first series; a directional aerial system coupled to said radio transmitter to radiate said first and second series of pulses as two narrow overlapping beams and to oscillate said beams repetitively over a limited sector in the azimuth plane about said required track; a radio receiver in said aircraft; said radio receiver including:

means for receiving signals derived from said pulses when said beams scan across the aircraft; separating means for separating received signals derived from individual pulses from each series; comparator means comparing said received signals and providing an output when signals corresponding to pulses in the two series are of equal amplitude; square wave generator means having an input fed with the output of said comparator means and providing a square wave output, the cross-over points of said square wave output occurring at instants of reception of the comparator output; said square wave generator thereby providing a square wave output in which the ratio of the mark and space periods represents the deviation in the respective plane, of the aircraft from said required track line.

4. A radio system for guidance of aircraft along a required track, comprising:

a radio transmitter located near one end of the track providing first and second series of pulses of radio frequency energy, the pulses of the second series being delayed with respect to said first series; a further radio transmitter, located adjacent said first transmitter, providing third and fourth series of pulses of radio frequency energy, the pulses of the fourth series being delayed with respect to said first series, the delay between the first and second series being substantially different from that between the third and fourth series; a directional aerial system coupled to said radio transmitter to radiate said first and second series of pulses as two narrow overlapping beams and to oscillate said beams repetitively over a limited sector in the azimuth plane about said required track; a further directional aerial system coupled to said further radio transmitter to radiate said third and fourth series of pulses as two narrow overlapping beams and to oscillate said beams repetitively over a limited sector in the elevation plane about said required track; a radio received in said aircraft; said radio receiver including:

means for receiving signals derived from said pulses when said beams scan across the aircraft; gating means separating received signals into two sets, one set consisting of the received signals from pulses in said first and second series, and the other set consisting of the received signals from pulses in said third and fourth series; first and second deviation determining means, each having an input to which is fed one of said sets of received signals, each deviation determining means including:

separating means for separating signals from individual pulses from each of the two series; means for determining the time instants when received signals from individual pulses in the two series are of equal amplitude; and means responsive to the difference in time period between such successive time instants to provide an output representing the deviation in the respective plane of the aircraft from said required track line;

5. A radio system for guidance of an aircraft along a required track, comprising:

a radio transmitter located near one end of the track providing first and second series of pulses of radio frequency energy, the pulses of the second series being delayed with respect to said first series; a further radio transmitter, located adjacent said first transmitter, providing third and fourth series of pulses of radio frequency energy, the pulses of the fourth series being delayed with respect to said first series, the delay between the first and second series being substantially different from that between the first and fourth series; a directional aerial system coupled to said radio transmitter to radiate said first and second series of pulses as two narrow overlapping beams and to oscillate said beams repetitively over a limited sector in the azimuth plane about said required track; a further directional aerial system coupled to said further radio transmitter to radiate said third and fourth series of pulses as two narrow overlapping beams and to oscillate said beams repetitively over a limited sector in the elevation plane about said required track; a radio receiver in said aircraft; said radio receiver including:

means for receiving signals derived from said pulses when said beams scan across the aircraft; gating means separating received signals into two sets, one set consisting of the received signals from pulses in said first and second series and the other set consisting of the received signals from pulses in said third and four series; and first and second deviation determining means, each having an input to which is fed one of said sets of received signals, each deviation determining means including:

separating means for separating received signals from individual pulses from each of the two series; comparator means comparing said received signals and providing an output when signals corresponding to pulses in the two series are of equal amplitude; square wave generator means having an input fed with the output of said comparator means and providing a square wave output; the cross-over points of said square wave output occurring at instants of reception of the comparator output; said square wave generator thereby providing square wave output in which the ratio of the mark and space periods represents the deviation, in the respective plane, of the aircraft from said required track line.

6. The structure recited in claim 5 wherein said radio transmitter includes first and second transmitting means providing said first and second series of pulses respectively and said further radio transmitter includes third and fourth transmitting means providing said third and fourth series of pulses respectively.

7. The structure recited in claim 6 wherein there is provided a single trigger generator providing trigger pulses to said transmitting means to initiate said pulses, the second and fourth transmitting means being coupled to receive through separate delay means the trigger pulses that are fed to said first and third transmitting means.

8. The structure recited in claim 7 wherein all the transmitting means radiate different frequencies.

9. In a radio system for guidance of an aircraft along a required track, the combination comprising:

a radio transmitter located near one end of the track and having a directional aerial system to radiate two overlapping narrow directional beams angularly spaced in the plane in which track guidance is required and means for oscillating said beams about the track line in said plane, said transmitter radiating on the two beams pulse modulated signals which are pulse modulated at the same pulse repetition frequency but with the pulses of one beam being delayed with respect to the pulses of the other beam; a receiver on the aircraft, said receiver having means for receiving and separating signals radiated on the two beams, means for determining the time instants when the signals on the two beams are of equal amplitude and means responsive to the differences in time periods between such successive time instants to provide a signal representing the deviation of the aircraft from the required track line; and a receiver at the location of said transmitter; said receiver being coupled to said transmitter and coupled to receive echo signals obtained when one of said beams scans across said aircraft, and having display means displaying the range and angular position of said aircraft in said plane.

10. A radio system for guidance of an aircraft along a required track, comprising:

a radio transmitter located near one end of the track providing first and second series of pulses of radio frequency energy, the pulses of the second series being delayed with respect to said first series; a further radio transmitter, located adjacent said first transmitter, providing third and fourth series of pulses of radio frequency energy, the pulses of the fourth series being delayed with respect to said first series, the delay between the first and second series being substantially different from that between the third and fourth series; a directional aerial system coupled to said radio transmitter to radiate said first and second series of pulses as two narrow overlapping beams and to oscillate said beams repetitively over a limited sector in the azimuth plane about said required track; a further directional aerial system coupled to said further radio transmitter to radiate said third and fourth series of pulses as two narrow overlapping beams and to oscillate said beams repetitively over a limited sector in the elevation plane about said required track; a radio receiver in said aircraft; said radio receiver including:

means for receiving signals derived from said pulses when said beams scan across the aircraft; gating means separating received signals into two sets, one set consisting of the received signals from pulses in said first and second series and the other set consisting of the received signals from pulses in said third and fourth series; and first and second deviation determining means, each having an input to which is fed one of said sets of received signals, each deviation determining means including separating means for separating signals from individual pulses from each of the two series; comparator means comparing said received signals and providing an output when signals corresponding to pulses in the two series are of equal amplitude; square wave generator means having an input fed with the output of said comparator means and providing a square wave output, the cross-over points of said square wave output occurring at instants of reception of the comparator output; said square wave generator thereby providing a square wave output in which the ratio of the mark and space periods represents the deviation in the respective plane, of the aircraft from said required track line, a radar receiver located adjacent said transmitter; said radar receiver coupled to said aerial system to receive echo signals derived when one of said beams scans across said aircraft, and having display means displaying the range and angular position of said aircraft in said plane.

11. A radio system for guidance of an aircraft along a required track, comprising:

a radio transmitter located near one end of the track providing first and second series of pulses of radio frequency energy, the pulses of the second series being delayed with respect to said first series; a further radio transmitter, located adjacent said first transmitter, providing third and fourth series of pulses of radio frequency energy, the pulses of the fourth series being delayed with respect to said first series, the delay between the first and second series being substantially different from that between the third and fourth series; a directional aerial system coupled to said radio transmitter to radiate said first and second series of pulses as two narrow overlapping beams and to oscillate said beams repetitively over a limited sector in the azimuth plane about said required track; a further directional aerial system coupled to said further radio transmitter to radiate said third and fourth series of pulses as two narrow overlapping beams and to oscillate said beams repetitively over a limited sector in the elevation plane about said required track; a radio receiver in said aircraft, said receiver having means for receiving signals derived from said pulses when said beams scan across the aircraft, and including gating means for separating received signal pulses of said first and second series from received signals derived from pulses of said third and fourth series; separating means for separating received signals derived from pulses in said first series from those derived from pulses in said second series, means for determining the time instants when received signals derived from pulses in the first and second series are of equal amplitude; and means responsive to the differences in time period between such successive time instants to determine the deviation of the aircraft in the azimuth plane from said required track line; further separating means for separating received signals derived from pulses in said third series from those de-derived from pulses in said fourth series; means for determining the time instants when received signals derived from pulses in the third and fourth series are of equal amplitude; and means responsive to the difference in the time periods between such successive time instants to determine the deviation of the aircraft in the elevation plane from said required track line, first and second radar receivers adjacent said transmitters each receiver being coupled to a respective transmitter and aerial system, and to receive echo signals derived when a beam from the respective aerial system scans across the aircraft, said first radar receiver including means for displaying the range and azimuth of said aircraft with respect to the aerial system and said second radar receiver including means for displaying the range and elevation of said aircraft with respect to said aerial system.

References Cited

UNITED STATES PATENTS

| | | | |
|---|---|---|---|
| 2,952,845 | 9/1960 | Begovich et al. | 343—108 |
| 2,112,283 | 3/1938 | Fritz | 343—108 |
| 2,524,758 | 10/1950 | Browder | 343—106 |
| 2,945,225 | 7/1960 | Sperber | 343—108 |
| 2,977,592 | 3/1961 | Bruck | 343—108 |

FOREIGN PATENTS 1,003,157    10/1965    Great Britain.

RICHARD A. FARLEY, *Primary Examiner.*

RODNEY D. BENNETT, *Examiner.*

H. C. WAMSLEY, *Assistant Examiner.*